United States Patent Office 2,971,948
Patented Feb. 14, 1961

2,971,948
PROCESS FOR PREPARING COPOLYMERS OF VINYL CHLORIDE

Günter Messwarb, Kelkheim (Taunus), and Walter Denk and Hans Scherer, Frankfurt am Main, Germany, assignors to Farbwerke Hoechst Aktiengesellschaft vormals Meister Lucius & Brüning, Frankfurt am Main, Germany, a corporation of Germany No Drawing. Filed May 7, 1957, Ser. No. 657,478

Claims priority, application Germany May 9, 1956

4 Claims. (Cl. 260—80.5)

The present invention relates to copolymers of vinyl chloride.

It is known that a good adhesion to metal surfaces may be imparted to soluble copolymers of vinyl chloride, for example lacquer products produced by copolymerization of vinyl chloride and vinyl acetate in a ratio of 87/13, by incorporating in these copolymers by polymerization additional small amounts of monomers containing carboxylic groups. A known copolymer consists for example of 86 parts by weight of vinyl chloride, 13 parts by weight of vinyl acetate and 1 part by weight of maleic acid. These polymers possess a poorer stability to the action of light and heat than analogous products which are free from carboxylic groups. It has been found that the stability of copolymers containing COOH-groups can be improved gradually by reprecipitation which generally takes place in preparing the polymer in solution. By such reprecipitation less stable low molecular portions are obviously removed.

It has already been proposed to prepare polymers by polymerizing compounds of the general formula

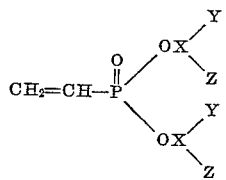

and

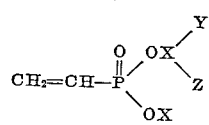

wherein X represents an aliphatic radical with 1-4 carbon atoms, Y a halogen atom and Z a halogen atom or a hydrogen atom, as such or in combination with copolymerizable compounds in the presence of peroxides or other radical forming agents.

Now we have found that vinyl phosphonic acid and/or vinyl phosphonic acid dichloride and/or the transformation products thereof, such as compounds having the formula:

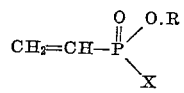

wherein R may represent an alkyl group containing 1-4 carbon atoms or the group —CH$_2$—CH$_2$—OH, and X represents a halogen atom or an OH-group, can be copolymerized with vinyl chloride and other polymerizable monomers copolymerizable with vinyl chloride, such as vinyl esters, preferably vinyl acetate, and also vinyl formiate, vinyl propionate, vinyl octanate, vinyl stearate, vinylidene chloride, acrylonitrile, and acrylic and methacrylic esters, for example those esters the alcoholic radical of which has a chain length of 1-4 carbon atoms. The proportion by weight of the phosphorus compound to the sum total of the other polymer components may vary within the limits of 10:90 to 0.10:99.90.

The copolymers so produced are lacquer products that adhere extremely well to metal surfaces. Especially good results are obtained if the aforesaid phosphorus compound is polymerized together with a mixture of vinyl chloride and vinyl acetate. The quantitive weight proportion of vinyl chloride to vinyl acetate may vary within the limits of 95:5 to 5:95. The resulting copolymers generally contain phosphorus in an amount of 0.01 to 3.0% by weight. It is very surprising that a good adhesion is already brought about by incorporating in the copolymers 0.5% (calculated on the total polymer) of vinyl phosphonic acid and/or vinyl phosphonic acid dichloride and/or of the transformation products thereof. The copolymers obtained by this invention have a heat stability superior to that of the known copolymers which contain carboxylic groups.

The vinyl phosphonic acid used in this invention may be produced by reacting vinyl phosphonic acid dichloride in an inert solvent with the calculated quantity of water and by subsequent elimination of the solvent and the hydrogen chloride. The vinyl phosphonic acid dichloride may be prepared by reacting vinyl phosphonic acid diesters with phosphorus pentachloride at a raised temperature.

Vinyl phosphonic acid and/or vinyl phosphonic acid dichloride and/or the transformation products of the latter compound may be copolymerized well under the usual conditions of polymerization with vinyl chloride and the other monomers mentioned above. The polymerization temperature may vary between 0 and 100° C.; as polymerization activators there may be used the known organic peroxides, for example benzoyl peroxide, lauroyl peroxide, caproyl peroxide, caprylyl peroxide, tertiary-butyl peroxide, tertiary butyl perbenzoate, and inorganic catalysts, for example potassium persulfate, hydrogen peroxide, potassium chlorate, and also azoiso-butyric acid dinitrile, and furthermore redox systems, such as the systems of hydrogen peroxide and formaldehyde sulfoxylate, alkali metal persulfates and bisulfite, hydrogen peroxide and ferro-sulfate. The polymerization may also be carried out under the action of ultra-violet light.

In an aqueous process it is preferred to introduce vinyl phosphonic acid into the reaction chamber together with the aqueous components, whereas vinyl phosphonic acid dichloride or the derivatives thereof are especially suitable for use in a solvent process or, in aqueous polymerization processes, are used in admixture with the monomers. In an aqueous medium vinyl phosphonic acid dichloride easily splits off hydrogen chloride so that preponderant free phosphonic acid groups are found in the polymer.

The aqueous emulsion-copolymerization may be carried out with the use of known emulsifiers, such as paraffin sulfonates, arylalkyl sulfonates, or sulfonates of fatty alcohols. It is however preferred to use the "destroyable" emulsifiers described in application Serial No. 637,859 so that the retained emulsifier does not impair the adhesiveness of the lacquers to the metal surfaces. The use of vinyl phosphonic acid and vinyl phosphonic acid dichloride is however not restricted to emulsion polymerization processes.

These monomers may also be used together with vinyl chloride for the production of the aforesaid lacquer products by a solvent or suspension process.

An activation of the selected monomeric mixture may be initiated with the aid of the known and already mentioned radical-forming agents, such as redox systems and peroxides.

The following examples serve to illustrate the invention but they are not intended to limit it thereto:

Example 1

7.55 l. of vinyl chloride and 1.5 kg. of vinyl acetate are introduced into a 40 liter autoclave and polymerized at 50° C. in a bath of 15 l. of water and 80 grams of betainyldodecyl ester hydrochloride with the use of a usual catalyst system consisting of 23 g. of formaldehyde sulfoxylate and 23.5 ml. of hydrogen peroxide while adding 40 g. of vinyl phosphonic acid. After the usual work up as proposed for destroyable emulsifiers, there is obtained a polymer having a K-value of 48 (1% in cyclohexanone). The product so produced is applied to an aluminum film and shows a good separating stability of 1.8–2.1 kg./5 cm. of film and possesses a good heat stability.

Example 2

A mixture of 7.55 l. of vinyl chloride, 1.2 kg. of vinyl acetate and 40 g. of vinyl phosphonic acid dichloride is introduced into a 40 liter autoclave and polymerized at 50° C. while stirring with the use of a redox catalyst system consisting of 18 g. of formaldehyde sulfoxylate and 18.0 ml. of hydrogen peroxide in a bath of 15 l. of water and 65 g. of betainyldodecyl ester hydrochloride. After the reaction is complete, the emulsifier is destroyed and the polymer precipitates. After the usual work up there is obtained a lacquer product having a K-value of 49 (1% in cyclohexanone) and a separating stability of an aluminum film of 1.5–2.0 kg./5 cm. film. The heat stability of the product so obtained is within the range known for analogous products prepared from vinyl chloride and vinyl acetate 87/13.

We claim:
1. A copolymer of 0.1–10 percent by weight of a member selected from the group consisting of vinyl phosphonic acid and vinyl phosphonic acid dichloride and 99.9–90 percent by weight of a mixture of vinyl chloride and a vinyl monomer selected from the group consisting of vinyl acetate, vinyl formate, vinyl propionate, vinyl octanoate, vinyl stearate, vinylidene chloride, acrylonitrile, and acrylic- and methacrylic-acid esters, the ratio, in parts by weight, of vinyl chloride to said vinyl monomer being in the range between 95:5 and 5:95.
2. A copolymer as in claim 1, wherein said vinyl monomer is vinyl acetate.
3. A copolymer as in claim 2, wherein said ratio, in parts by weight, of vinyl chloride to vinyl acetate is in the range between 95:5 and 80:20.
4. A copolymer as in claim 1, wherein said vinyl monomer is a methacrylic acid ester of an alcohol having 1–4 carbon atoms.

References Cited in the file of this patent

UNITED STATES PATENTS

| | | |
|---|---|---|
| 2,439,214 | Lindsey et al. | Apr. 6, 1948 |
| 2,557,805 | Upson | June 19, 1951 |
| 2,636,027 | Coover et al. | Apr. 21, 1953 |
| 2,827,475 | Coover et al. | Mar. 18, 1958 |